Sept. 1, 1931.  L. BAGET  1,821,785
DEVICE FOR STANDARDIZING SHUNTS
Filed July 29, 1930
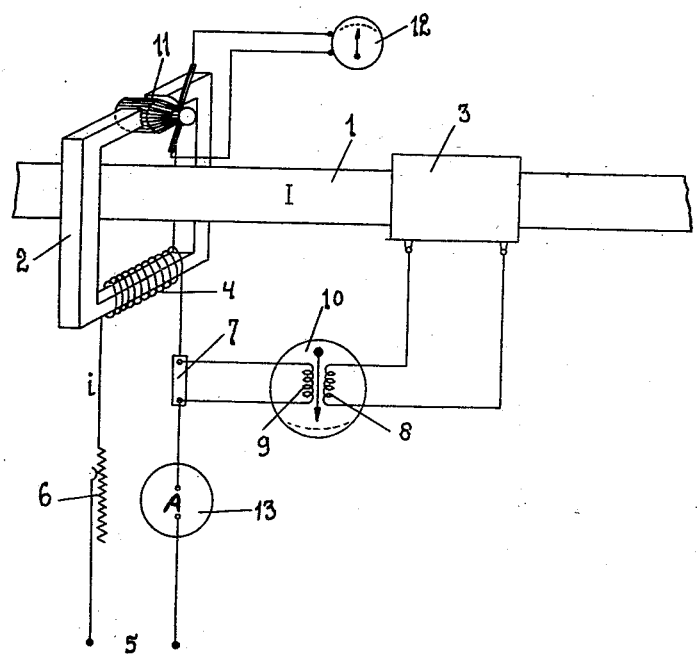
INVENTOR
LEON BAGET
BY HIS ATTORNEYS
Howson and Howson Patented Sept. 1, 1931

1,821,785

UNITED STATES PATENT OFFICE

LÉON BAGET, OF PARIS, FRANCE, ASSIGNOR TO COMPAGNIE DE PRODUITS CHIMIQUES ET ELECTROMETALLURGIQUES ALAIS, FROGES ET CAMARQUE, OF PARIS, FRANCE, A CORPORATION OF FRANCE

DEVICE FOR STANDARDIZING SHUNTS

Application filed July 29, 1930, Serial No. 471,570, and in France October 15, 1929.

The present invention has for its object a method and device for standardizing high intensity shunts (up to 30,000 amperes) used with direct current.

Measuring direct current high intensities is actually effected by a method which consists in opposing, to the flux produced in a magnetic circuit by the conductor through which flows the high intensity current, a flux produced by a winding disposed on the same magnetic circuit. A rotating armature, disposed in the magnetic circuit, and provided with a measuring apparatus connected to its terminals, serves to indicate when these two fluxes annul each other. When this condition is obtained, there is but to measure the current that flows through the winding for deducing therefrom the current intensity in the conductor disposed in the magnetic circuit.

This method is also applied for standardizing shunts, but it has the disadvantage of necessitating a very accurate standardization of the millivoltmeters that are to be connected to the shunts to be verified and of the ammeter that serves to measure the current intensity through the winding.

The method and device according to the present invention eliminate the necessity of these standardizations and the causes of errors that result therefrom.

This method consists in comparing the high intensity shunts to standard shunts through a differential galvanometer, this comparison being made possible by inducing in a magnetic circuit two opposed fluxes, one produced by the high intensity current, and the other by a winding connected in series with the standard shunt and by so regulating the current through said winding that the two fluxes annul each other.

The method for standardizing high intensity shunts is thus very much simplified, owing to the fact that it makes it possible to directly measure the error of the shunt to be standardized, provided that a suitable ratio of the standard shunt to the shunt to be standardized be chosen.

An embodiment of my invention will be described with reference to the appended drawing, which diagrammatically shows a standardizing device according to my invention.

The conductor 1, through which flows the high intensity direct current, is surrounded by the magnetic circuit 2. The shunt to be standardized is shown in 3. The magnetic circuit 2 is provided with a winding 4 which is fed by a source of direct current 5. The current $i$ through the winding is regulated by means of a rheostat 6. The standard shunt 7, preferably of the multiple type, for the different values of shunts that are to be verified, is connected in series with winding 4. The terminals of shunts 3 and 7 are respectively connected to the windings 8 and 9 of a differential galvanometer 10.

A rotating armature 11, actuated by a motor, is inserted in the magnetic circuit, and a millivoltmeter 12 is connected to the terminals of said armature. An ammeter 13 serves to measure the intensity $i$ in order to determine the value of current I.

The current in winding 4 is given a direction and a value such that the flux produced by said winding in the magnetic circuit 2 may neutralize the flux produced by the conductor 1. The millivoltmeter 12 makes it possible to find out when this condition is fulfilled. At this time there is a constant ratio of intensity I to intensity $i$:

$$K=\frac{I}{i}$$

For instance, if I=20,000 amperes and K=3,000 then $i$=6.66 amperes.

When the two fluxes annul each other, instead of measuring this current $i$ and the voltage U at the terminals of the shunt, which measurings must be made simultaneously on account of the variations of current I, one compares the tension U to the tension $u$ given by the standard shunt 7 by means of the differential galvanometer 10.

If $U=u$, the differential galvanometer reads zero.

If $u=U\pm\epsilon$, the differential galvanometer reads $\pm\epsilon$, thus directly giving the error of the shunt to be verified.

If $u$ has been chosen equal to 100, this error will be given in per cent.

When, according to the usual method, $i$ and $I$ are measured (through $u$ and $U$), the error in the measure is the sum of the errors in the measures of $(u-U)$ and of $u$, said errors being of the first order.

On the contrary, according to the invention, $\epsilon$ is directly measured and the error is reduced to that of the differential galvanometer, which is of the second order.

On account of the residual magnetism in the magnetic circuit, the method consisting to oppose the fluxes could give inaccurate results due to the fact that the zero graduation of the galvanometer does not correspond any longer to the neutralization of the opposed fluxes produced by $i$ and $I$ alone.

In order to obviate this drawback, the current $I$ is cut off and the magnetic circuit 2 is saturated by means of the winding 4; then the current in said winding is decreased to a value for which the flux detecting system indicates that the flux is zero. At this time, the value $i_0$ of the current is equal to the abscissa at the origin of the hysteresis cycle. There is but to mark it in absolute value on the differential galvanometer. This quantity is thus automatically subtracted from the value $i$ when $u-U$ is read.

While I have disclosed what I deem to be the preferred embodiment of my invention, I do not wish to be limited thereto as there might be changes made in the disposition and form of the different elements of my device without departing from the principle of my invention as comprehended within the scope of the appended claims. For instance, the differential galvanometer could be of any type, and the different apparatus in the device fed in any suitable manner.

What I claim is:

1. The method for standardizing a shunt connected to a conductor through which flows a high intensity direct current, which consists in inserting the shunt to be verified and a standard shunt respectively in two circuits adapted to induce equal and opposite fluxes in the same magnetic circuit and in comparing said shunts by means of a differential galvanometer.

2. The method for standardizing a shunt connected to a conductor through which flows a high intensity direct current which consists in disposing a magnetic circuit about said conductor, producing in said magnetic circuit a flux opposed to that induced by said conductor by means of a winding connected in series to a standard shunt, regulating the current through said winding so that the resultant flux in the magnetic circuit is zero, and then comparing the shunt to be verified with the standard shunt by means of a differential galvanometer, whereby the difference between the said shunts may be directly read on the galvanometer.

3. The device for standardizing a shunt connected to a conductor through which flows a high intensity direct current, said device comprising a magnetic circuit adapted to be mounted about the conductor to which the shunt to be verified is connected, a rotatable armature inserted in said circuit, means for measuring the current through said armature, a winding on said magnetic circuit adapted to produce therein a flux opposed to that produced by the conductor, means for feeding said winding, a standard shunt connected in series with said winding, means for regulating the current through said winding, and a differential galvanometer adapted to be connected on the one hand with the standard shunt and on the other hand with the shunt to be standardized.

4. The device for standardizing a shunt connected to a conductor through which flows a high intensity direct current, said device comprising a magnetic circuit adapted to be mounted about the conductor to which the shunt to be verified is connected, a rotatable armature inserted in said circuit, means for measuring the current through said armature, a winding on said magnetic circuit adapted to produce therein a flux opposed to that produced by the conductor, means for feeding said winding, a standard shunt connected in series with said winding, an adjustable resistance for regulating the current through said winding, and a differential galvanometer adapted to be connected on one side with the standard shunt and on the other side with the shunt to be standardized, the zero graduation of said galvanometer being so displaced with respect to the true zero point as to automatically compensate for the residual magnetism in the magnetic circuit.

In testimony whereof I have signed my name to this specification.

LÉON BAGET.